United States Patent
Shih et al.

(10) Patent No.: US 10,701,734 B2
(45) Date of Patent: Jun. 30, 2020

(54) METHOD AND APPARATUS OF SELECTING BANDWIDTH PART FOR RANDOM ACCESS (RA) PROCEDURE IN A WIRELESS COMMUNICATION SYSTEM

(71) Applicant: ASUSTek Computer Inc., Taipei (TW)

(72) Inventors: Tun-Huai Shih, Taipei (TW); Richard Lee-Chee Kuo, Taipei (TW); Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/208,883

(22) Filed: Dec. 4, 2018

(65) Prior Publication Data

US 2019/0208548 A1 Jul. 4, 2019

Related U.S. Application Data

(60) Provisional application No. 62/611,302, filed on Dec. 28, 2017.

(51) Int. Cl.
*H04W 74/08* (2009.01)
*H04W 74/00* (2009.01)
(Continued)

(52) U.S. Cl.
CPC ....... *H04W 74/0833* (2013.01); *H04L 5/0051* (2013.01); *H04L 5/0053* (2013.01);
(Continued)

(58) Field of Classification Search
CPC . H04W 74/00; H04W 74/002; H04W 74/004; H04W 74/006; H04W 74/008;
(Continued)

(56) References Cited

U.S. PATENT DOCUMENTS

| | | | |
|---|---|---|---|
| 2019/0045549 A1* | 2/2019 | Wu | H04W 36/0055 |
| 2019/0150200 A1* | 5/2019 | Chen | H04W 74/0833 370/329 |
| 2019/0191464 A1* | 6/2019 | Loehr | H04W 74/0833 |

FOREIGN PATENT DOCUMENTS

| | | |
|---|---|---|
| WO | 2016086144 | 6/2016 |
| WO | 2018121621 | 7/2018 |

OTHER PUBLICATIONS

3GPP: "3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre ; 650, Route Des Lucioles ; F-06921 Sophia-Antipolis Cedex ; France, vol. RAN WG2, No. V2.0.0, Dec. 11, 2017 (Dec. 11, 2017), pp. 1-55, XP051391867, [retrieved on Dec. 11, 2017].

(Continued)

*Primary Examiner* — Ashley Shivers
(74) *Attorney, Agent, or Firm* — Blue Capital Law Firm, P.C.

(57) ABSTRACT

A method and apparatus are disclosed from the perspective of a UE (User Equipment). In one embodiment, the method includes the UE initiating a Random Access (RA) procedure on a Serving Cell, wherein the UE has multiple active uplink bandwidth parts (UL BWP) for the Serving Cell. The method further includes the UE selecting a UL BWP from the multiple active UL BWPs for an Msg1 transmission, based on a first rule. The method also includes the UE transmitting the Msg1 on the selected UL BWP.

18 Claims, 8 Drawing Sheets

(51) Int. Cl.
  H04W 24/10 (2009.01)
  H04W 72/02 (2009.01)
  H04W 72/04 (2009.01)
  H04L 5/00 (2006.01)
  H04W 72/12 (2009.01)
  H04W 80/02 (2009.01)
  H04W 88/02 (2009.01)

(52) U.S. Cl.
  CPC ........... *H04W 24/10* (2013.01); *H04W 72/02* (2013.01); *H04W 72/042* (2013.01); *H04W 72/0453* (2013.01); *H04W 74/004* (2013.01); *H04W 72/1289* (2013.01); *H04W 80/02* (2013.01); *H04W 88/02* (2013.01)

(58) Field of Classification Search
  CPC .. H04W 74/08; H04W 74/0833; H04W 72/02
  See application file for complete search history.

(56) References Cited

OTHER PUBLICATIONS

3GPP: "3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. VI.1.2, Dec. 12, 2017 (Dec. 12, 2017), pp. 1-38, XP051391917, [retrieved on Dec. 12, 2017].

European Search Report in corresponding EP Application No. 18210010.7, dated Apr. 26, 2019.

Hu Awe I et al: "BWP issues for EN-DC completion", 3GPP Draft; R2-1712322 BWP Issues for EN-DC Completion, 3rd Generation Partnership Project (3GPP), Mobile Competence Centre ; 650, Route Des Lucioles ; F-06921 Sophia-Antipolis Cedex ; France, vol. RAN WG2, No. Reno, USA; Nov. 27, 2017-Dec. 1, 2017 Nov. 17, 2017 (Nov. 17, 2017), XP051371402.

Communication pursuant to Article 94(3) EPC in corresponding EP Application No. 18210010.7, dated Mar. 5, 2020.

3GPP: "3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre ; 650, Route Des Lucioles ; F-06921 Sophia-Antipolis Cedex ; France, vol. RAN WG2, No. V2.0.0, Dec. 11, 2017 (Dec. 11, 2017), pp. 1-55, XP051391867.

* cited by examiner

METHOD AND APPARATUS OF SELECTING BANDWIDTH PART FOR RANDOM ACCESS (RA) PROCEDURE IN A WIRELESS COMMUNICATION SYSTEM

CROSS-REFERENCE TO RELATED APPLICATIONS

The present Application claims the benefit of U.S. Provisional Patent Application Ser. No. 62/611,302 filed on Dec. 28, 2017, the entire disclosure of which is incorporated herein in its entirety by reference.

FIELD

This disclosure generally relates to wireless communication networks, and more particularly, to a method and apparatus of selecting bandwidth part for random access (RA) procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE initiating a Random Access (RA) procedure on a Serving Cell, wherein the UE has multiple active uplink bandwidth parts (UL BWP) for the Serving Cell. The method further includes the UE selecting a UL BWP from the multiple active UL BWPs for an Msg1 transmission, based on a first rule. The method also includes the UE transmitting the Msg1 on the selected UL BWP.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 V14.1.0, "Study on Scenarios and Requirements for Next Generation Access Technologies"; RAN1#88bis Chairman's note; RAN1#89 Chairman's note; RAN1 adhoc #2 Chairman's note; RAN1#90 Chairman's note; RAN1 adhoc #3 Chairman's note; RAN1#90bis Chairman's note; RAN1#91 Chairman's note; RAN2#97bis Chairman's note; RAN2#98 Chairman's note; RAN2 adhoc #2 Chairman's note; RAN2#99 Chairman's note; RAN2#99bis Chairman's note; RAN2#100 Chairman's note; TS 38.321 V2.0.0, "Medium Access Control (MAC) protocol specification"; and TS 36.321 V14.4.0, "Medium Access Control (MAC) protocol specification". The standards and documents listed above are hereby expressly incorporated by reference in their entirety.

Figure 1:
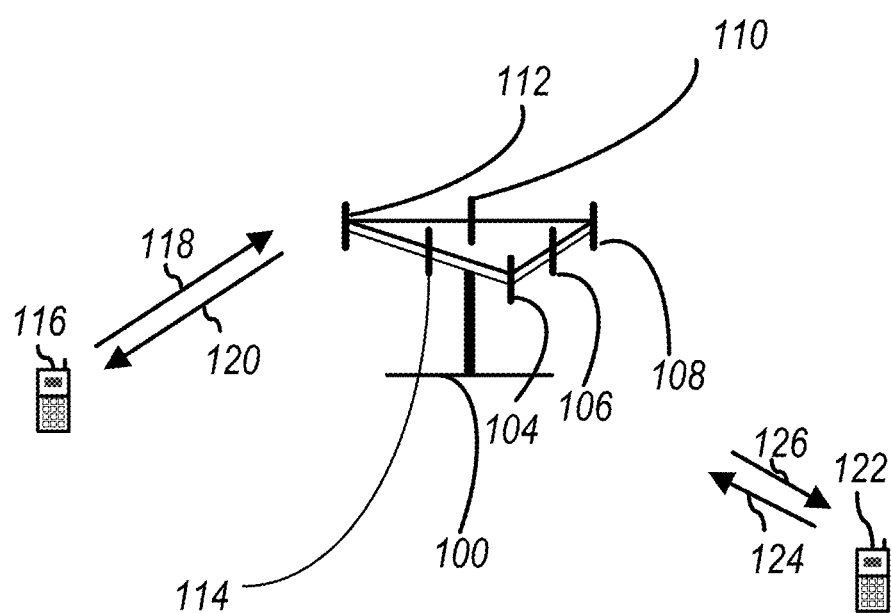
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
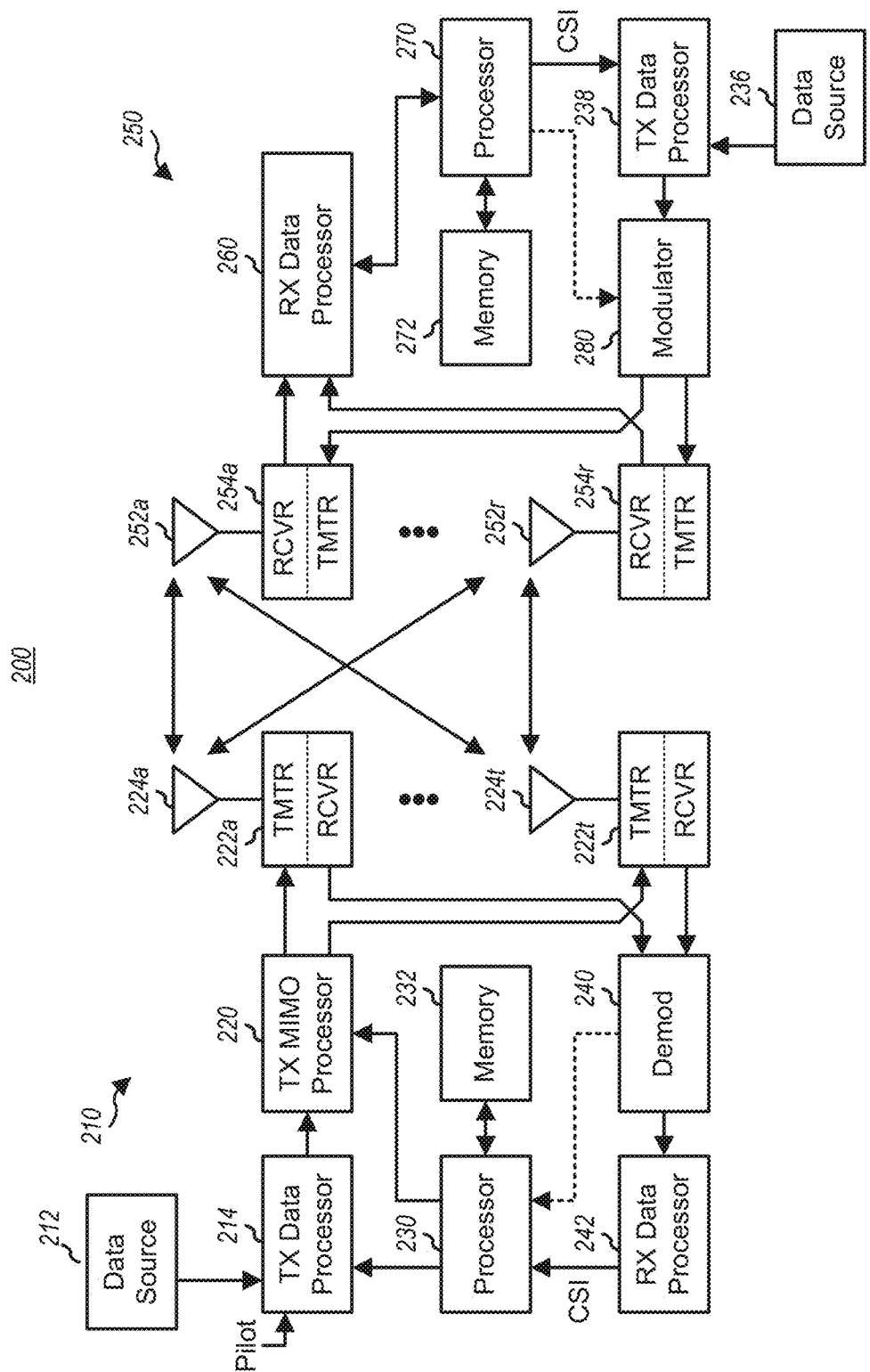
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
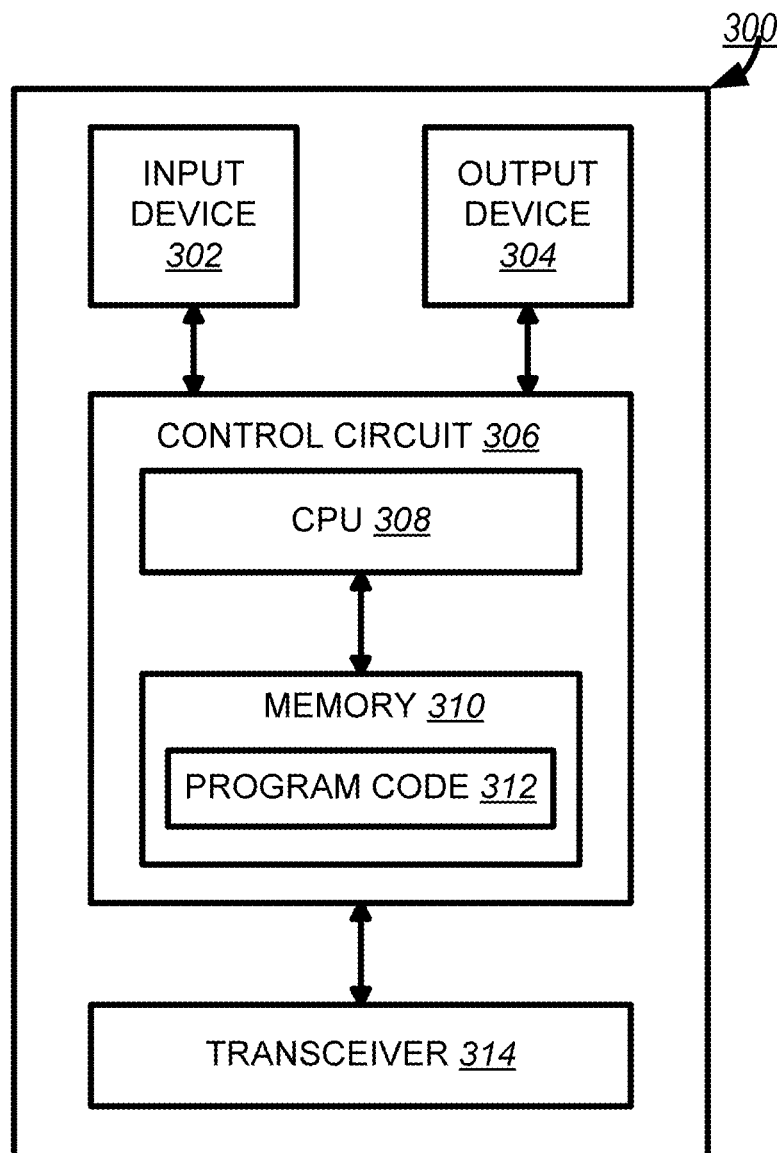
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
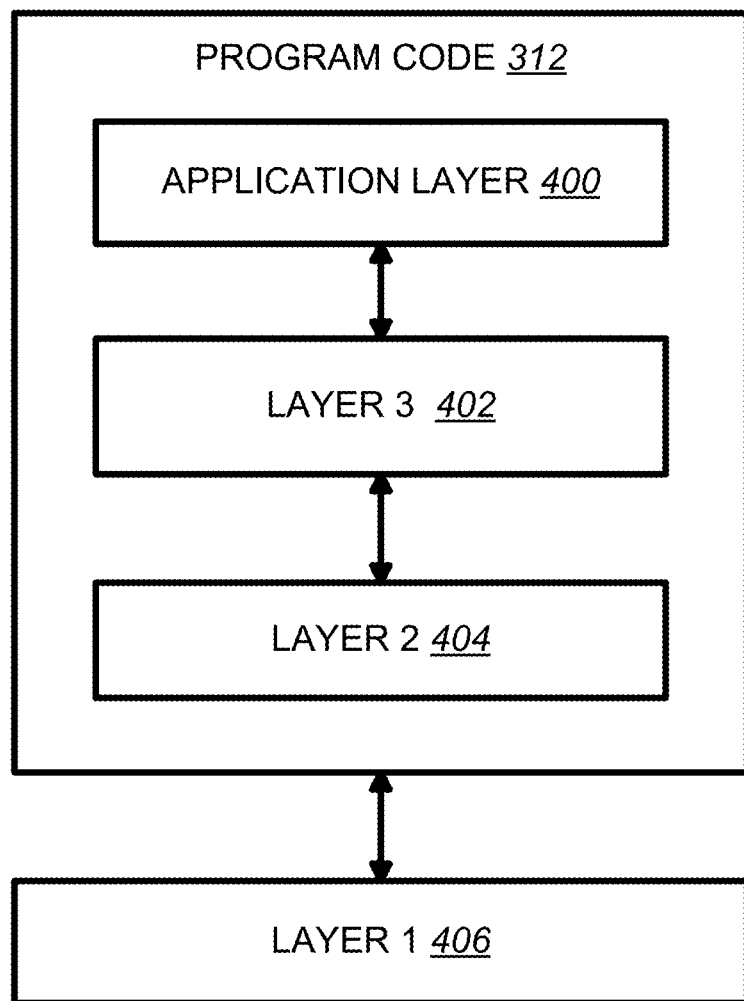
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

In NR, bandwidth part (BWP) is introduced and discussed in RAN1. Some agreements are captured in RAN1#88bis Chairman's note, RAN1#89 Chairman's note, RAN1 adhoc #2 Chairman's note, RAN1#90 Chairman's note, RAN1 adhoc #3 Chairman's note, RAN1#90bis Chairman's note, and RAN1#91 Chairman's note as discussed below.

The RAN1#88bis Chairman's note includes the following agreements:
Working Assumption:
  One or multiple bandwidth part configurations for each component carrier can be semi-statically signalled to a UE
    A bandwidth part consists of a group of contiguous PRBs
      Reserved resources can be configured within the bandwidth part
    The bandwidth of a bandwidth part equals to or is smaller than the maximal bandwidth capability supported by a UE
    The bandwidth of a bandwidth part is at least as large as the SS block bandwidth
      The bandwidth part may or may not contain the SS block
    Configuration of a bandwidth part may include the following properties
    Numerology
      Frequency location (e.g. center frequency)
      Bandwidth (e.g. number of PRBs)
    Note that it is for RRC connected mode UE
    FFS how to indicate to the UE which bandwidth part configuration (if multiple) should be assumed for resource allocation at a given time
  FFS neighbour cell RRM The RAN1#89 Chairman's note includes the following agreements:
Agreements:
  Confirm the WA of RAN1#88bis.
  Each bandwidth part is associated with a specific numerology (sub-carrier spacing, CP type)
    FFS: slot duration indication if RAN1 decides to not to downselect between 7 symbol and 14 symbols for NR slot duration
  UE expects at least one DL bandwidth part and one UL bandwidth part being active among the set of configured bandwidth parts for a given time instant.
    A UE is only assumed to receive/transmit within active DL/UL bandwidth part(s) using the associated numerology
      At least PDSCH and/or PDCCH for DL and PUCCH and/or PUSCH for UL
        FFS: down selection of combinations
    FFS if multiple bandwidth parts with same or different numerologies can be active for a UE simultaneously
    It does not imply that it is required for UE to support different numerologies at the same instance.
    FFS: TB to bandwidth part mapping
  The active DL/UL bandwidth part is not assumed to span a frequency range larger than the DL/UL bandwidth capability of the UE in a component carrier.
  Specify necessary mechanism to enable UE RF retuning for bandwidth part switching
Agreements:
  In case of one active DL BWP for a given time instant,
    Configuration of a DL bandwidth part includes at least one CORESET.
    A UE can assume that PDSCH and corresponding PDCCH (PDCCH carrying scheduling assignment for the PDSCH) are transmitted within the same BWP if PDSCH transmission starts no later than K symbols after the end of the PDCCH transmission.
    In case of PDSCH transmission starting more than K symbols after the end of the corresponding PDCCH, PDCCH and PDSCH may be transmitted in different BWPs
    FFS: Value of K (may depend on numerology, possibly reported UE retuning time, etc)
  For the indication of active DL/UL bandwidth part(s) to a UE, the following options are considered (including combinations thereof)
    Option #1: DCI (explicitly and/or implicitly)
    Option #2: MAC CE
    Option #3: Time pattern (e.g. DRX like)
Details FFS The RAN1 adhoc #2 Chairman's note includes the following agreements:
Agreement:
  For FDD, separate sets of bandwidth part (BWP) configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
  For TDD, separate sets of BWP configurations for DL & UL per component carrier
    The numerology of DL BWP configuration is applied to at least PDCCH, PDSCH & corresponding DMRS
    The numerology of UL BWP configuration is applied to at least PUCCH, PUSCH & corresponding DMRS
    For UE, if different active DL and UL BWPs are configured, UE is not expected to retune the center frequency of channel BW between DL and UL
Agreements:
  Activation/deactivation of DL and UL bandwidth parts can be
    by means of dedicated RRC signaling
      Possibility to activate in the bandwidth part configuration
    by means of DCI (explicitly and/or implicitly) or MAC CE [one to be selected]
      by means of DCI could mean
        Explicit: Indication in DCI (FFS: scheduling assignment/grant or a separate DCI) triggers activation/deactivation
          Separate DCI means DCI not carrying scheduling assignment/grant
        Implicit: Presence of DCI (scheduling assignment/grant) in itself triggers activation/deactivation
        This does not imply that all these alternatives are to be supported.

FFS: by means of timer
FFS: according to configured time pattern
The RAN1#90 Chairman's note includes the following agreements:
Agreements:
  There is an initial active DL/UL bandwidth part pair to be valid for a UE until the UE is explicitly (re)configured with bandwidth part(s) during or after RRC connection is established
    The initial active DL/UL bandwidth part is confined within the UE minimum bandwidth for the given frequency band
    FFS: details of initial active DL/UL bandwidth part are discussed in initial access agenda
  Support activation/deactivation of DL and UL bandwidth part by explicit indication at least in (FFS: scheduling) DCI
    FFS: In addition, MAC CE based approach is supported
  Support activation/deactivation of DL bandwidth part by means of timer for a UE to switch its active DL bandwidth part to a default DL bandwidth part
    The default DL bandwidth part can be the initial active DL bandwidth part defined above
    FFS: The default DL bandwidth part can be reconfigured by the network
    FFS: detailed mechanism of timer-based solution (e.g. introducing a new timer or reusing DRX timer)
    FFS: other conditions to switch to default DL bandwidth part
The RAN1 adhoc #3 Chairman's note includes the following agreements:
Agreements:
  In Rel-15, for a UE, there is at most one active DL BWP and at most one active UL BWP at a given time for a serving cell
Agreements:
  For each UE-specific serving cell, one or more DL BWPs and one or more UL BWPs can be configured by dedicated RRC for a UE
    FFS association of DL BWP and UL BWP
    FFS definition of an active cell in relation to DL BWP and UL BWP, whether or not there are cross-cell/cross-BWP interactions
Agreements:
  NR supports the case that a single scheduling DCI can switch the UE's active BWP from one to another (of the same link direction) within a given serving cell
    FFS whether & how for active BWP switching only without scheduling (including the case of UL scheduling without UL-SCH)
The RAN1#90bis Chairman's note includes the following agreements:
Agreements:
  For paired spectrum, DL and UL BWPs are configured separately and independently in Rel-15 for each UE-specific serving cell for a UE
    For active BWP switching using at least scheduling DCI, DCI for DL is used for DL active BWP switching and DCI for UL is used for UL active BWP switching
      FFS whether or not to support a single DCI switching DL and UL BWP jointly
  For unpaired spectrum, a DL BWP and an UL BWP are jointly configured as a pair, with the restriction that the DL and UL BWPs of such a DL/UL BWP pair share the same centre frequency but may be of different bandwidths in Rel-15 for each UE-specific serving cell for a UE
    For active BWP switching using at least scheduling DCI, DCI for either DL or UL can be used for active BWP switching from one DL/UL BWP pair to another pair
    Note: there is no additional restriction on DL BWP and UL BWP pairing
    Note: this applies to at least the case where both DL & UL are activated to a UE in the corresponding unpaired spectrum
Agreements:
  For a UE, a configured DL (or UL) BWP may overlap in frequency domain with another configured DL (or UL) BWP in a serving cell
[ . . . ]
Agreements:
  For paired spectrum, support a dedicated timer for timer-based active DL BWP switching to the default DL BWP
    A UE starts the timer when it switches its active DL BWP to a DL BWP other than the default DL BWP
    A UE restarts the timer to the initial value when it successfully decodes a DCI to schedule PDSCH(s) in its active DL BWP
    FFS other cases
    A UE switches its active DL BWP to the default DL BWP when the timer expires
    FFS other conditions (e.g. interaction with DRX timer)
  For unpaired spectrum, support a dedicated timer for timer-based active DL/UL BWP pair switching to the default DL/UL BWP pair
    A UE starts the timer when it switches its active DL/UL BWP pair to a DL/UL BWP pair other than the default DL/UL BWP pair
    A UE restarts the timer to the initial value when it successfully decodes a DCI to schedule PDSCH(s) in its active DL/UL BWP pair
    FFS other cases
    A UE switches its active DL/UL BWP pair to the default DL/UL BWP pair when the timer expires
    FFS other conditions (e.g. interaction with DRX timer)
  FFS the range and granularity of the timer
Agreements:
  For an Scell, RRC signaling for Scell configuration/reconfiguration indicates the first active DL BWP and/or the first active UL BWP when the Scell is activated
    NR supports Scell activation signaling that doesn't contain any information related to the first active DL/UL BWP
  For an Scell, active DL BWP and/or UL BWP are deactivated when the Scell is deactivated
    Note: it's RAN1's understanding that Scell can be deactivated by an Scell timer
Agreements:
  For an Scell, a UE can be configured with the following:
    a timer for timer-based active DL BWP (or DL/UL BWP pair) switching, along with a default DL BWP (or the default DL/UL BWP pair) which is used when the timer is expired
      The default DL BWP can be different from the first active DL BWP
  For Pcell, the default DL BWP (or DL/UL BWP pair) can be configured/reconfigured to a UE If no default DL BWP is configured, the default DL BWP is the initial active DL BWP

[ . . . ]

Agreements:

In Pcell, for a UE, common search space for at least RACH procedure can be configured in each BWP FFS whether or not there are any additional UE behavior that needs to be specified In a serving cell, for a UE, common search space for group-common PDCCH (e.g. SFI, pre-emption indication, etc.) can be configured in each BWP Agreements:

The initial active DL BWP is defined as frequency location and bandwidth of RMSI CORESET and numerology of RMSI.

PDSCH delivering RMSI are confined within the initial active DL BWP

The RAN1#91 Chairman's note includes the following agreements:

Conclusion:

No change on DL/UL BWP pairing for unpaired spectrum in RAN1#90bis and it's up to specification rapporteur's decision on how to simplify the specification text as long as the linking between DL BWP and UL BWP sharing the same center frequency is kept.

Agreements:

A UE is expected to perform CSI measurement only within its active DL BWP at the time when the measurement occurs

[ . . . ]

Agreements:

For timer-based active DL BWP (DL/UL BWP pair) switching,

Granularity of the timer: 1 ms (subframe) for sub6, 0.5 ms (half-subframe) for mmWave Maximal time length of the timer: approximately 50 ms It's up to RAN2's decision on a set of exact values for the timer initial setting and whether or not to enable/disable the timer (e.g., via a very large timer value)

[ . . . ]

Agreements:

In unpaired spectrum, for timer-based active DL/UL BWP pair switching, a UE restarts the timer to the initial value when the following additional conditions are met It detects a DCI scheduling PUSCH for its current active DL/UL BWP pair It's RAN1's understanding that the remaining issues of timer-based active DL BWP (DL/UL BWP pair) switching (e.g. additional timer restarting/expiration conditions, inter-action with RACH procedure and grant-free scheduling) will be discussed in RAN2

Send an LS to RAN2—Peter A. (Qualcomm), R1-1721668, which is approved and final LS in R1-1721714

The NR MAC Running Technical Specification is currently under discussion. 3GPP TS 38.321 includes the following text related to the BWP (Bandwidth Part) operation:

5.15 Bandwidth Part (BWP) Operation

A Serving Cell may be configured with at most four BWPs, and for an activated Serving Cell, there is always one active BWP at any point in time.

The BWP switching for a Serving Cell is used to activate an inactive BWP and deactivate an active BWP at a time, and is controlled by the PDCCH indicating a downlink assignment or an uplink grant. Upon addition of SpCell or activation of an SCell, one BWP is initially active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

On the active BWP for each activated Serving Cell configured with a BWP, the MAC entity shall apply normal operations including:

1> transmit on UL-SCH;
1> transmit on RACH;
1> monitor the PDCCH;
1> transmit PUCCH;
1> receive DL-SCH;
1> (re-)initialize any suspended configured uplink grants of configured grant Type 1 according to the stored configuration, if any, and to start in the symbol according to rules in subclause 5.8.2.

On the inactive BWP for each activated Serving Cell configured with a BWP, the MAC entity shall:

1> not transmit on UL-SCH;
1> not transmit on RACH;
1> not monitor the PDCCH;
1> not transmit PUCCH;
1> not receive DL-SCH;
1> clear any configured downlink assignment and configured uplink grant of configured grant Type 2;
1> suspend any configured uplink grant of configured Type 1.

Upon initiation of the Random Access procedure, the MAC entity shall:

1> if PRACH resources are configured for the active UL BWP:
   2> perform the Random Access procedure on the active DL BWP and UL BWP;
1> else (i.e. PRACH resources are not configured for the active UL BWP):
   2> switch to initial DL BWP and UL BWP;
   2> perform the Random Access procedure on the initial DL BWP and UL BWP.

If the MAC entity receives a PDCCH for BWP switching while a Random Access procedure is ongoing in the MAC entity, it is up to UE implementation whether to switch BWP or ignore the PDCCH for BWP switching. If the MAC entity decides to perform BWP switching, the MAC entity shall stop the ongoing Random Access procedure and initiate a Random Access procedure on the new activated BWP. If the MAC decides to ignore the PDCCH for BWP switching, the MAC entity shall continue with the ongoing Random Access procedure on the active BWP.

If BWP-InactivityTimer is configured, the MAC entity shall for each activated Serving Cell:

1> if the Default-DL-BWP is configured, and the active DL BWP is not the BWP indicated by the Default-DL-BWP; or
1> if the Default-DL-BWP is not configured, and the active DL BWP is not the initial BWP:
   2> if a PDCCH indicating downlink assignment is received on the active BWP; or
   2> if a PDCCH for BWP switching is received on the active DL BWP, and the MAC entity switches the active BWP:
      3> start or restart the BWP-InactivityTimer associated with the active DL BWP;
   2> if Random Access procedure is initiated:
      3> stop the BWP-InactivityTimer;

2> if BWP-InactivityTimer associated with the active DL BWP expires:
   3> if the Default-DL-BWP is configured:
      4> perform BWP switching to a BWP indicated by the Default-DL-BWP;
   3> else:
      4> perform BWP switching to the initial DL BWP.

As stated above, the NR MAC Running Technical Specification is currently under discussion. 3GPP TS 38.321 includes the following text related to the RA procedure:

5.1 Random Access Procedure 5.1.1 Random Access Procedure Initialization

The Random Access procedure described in this sub-clause is initiated by a PDCCH order, by the MAC entity itself, by beam failure indication from lower layer, or by RRC for the events in accordance with TS 38.300 [2]. There is only one Random Access procedure ongoing at any point in time in a MAC entity. The Random Access procedure on an SCell other than PSCell shall only be initiated by a PDCCH order with ra-PreambleIndex different from 0b000000.

NOTE: If the MAC entity receives a request for a new Random Access procedure while another is already ongoing in the MAC entity, it is up to UE implementation whether to continue with the ongoing procedure or start with the new procedure (e.g. for SI request).

RRC configures the following parameters for the Random Access procedure:
  prach-ConfigIndex: the available set of PRACH resources for the transmission of the Random Access Preamble;
  ra-PreambleInitialReceivedTargetPower: initial preamble power;
  rsrp-ThresholdSSB, csirs-dedicatedRACH-Threshold, and sul-RSRP-Threshold: an RSRP threshold for the selection of the SS block and corresponding PRACH resource;
  ra-PreamblePowerRampingStep: the power-ramping factor;
  ra-PreambleIndex: Random Access Preamble;
  ra-PreambleTx-Max: the maximum number of preamble transmission;
  if SSBs are mapped to preambles:
    startIndexRA-PreambleGroupA, numberOfRA-Preambles, and numberOfRA-PreamblesGroupA for each SSB in each group (SpCell only);
  else:
    startIndexRA-PreambleGroupA, numberOfRA-Preambles, and numberOfRA-PreamblesGroupA in each group (SpCell only);
  If numberOfRA-PreamblesGroupA is equal to numberOfRA-Preambles, there is no Random Access Preambles group B.
  The preambles in Random Access Preamble group A are the preambles startIndexRA-PreambleGroupA to startIndexRA-PreambleGroupA+numberOfRA-PreamblesGroupA−1.
  The preambles in Random Access Preamble group B, if exists, are the preambles startIndexRA-PreambleGroupA+numberOfRA-PreamblesGroupA to startIndexRA-PreambleGroupA+numberOfRA-Preambles−1;
  NOTE: if random Access Preambles group B is supported by the cell and SSBs are mapped to preambles, random access preambles group B is included in each SSB.
  if Random Access Preambles group B exists:
    ra-Msg3SizeGroupA (per cell): the threshold to determine the groups of Random Access Preambles;
    the set of Random Access Preambles for SI request and corresponding PRACH resource(s), if any;
    the set of Random Access Preambles for beam failure recovery request and corresponding PRACH resource(s), if any;
  ra-ResponseWindow: the time window to monitor RA response(s);
  bfr-ResponseWindow: the time window to monitor response(s) on beam failure recovery request;
  ra-ContentionResolutionTimer: the Contention Resolution Timer (SpCell only).

In addition, the following information for related Serving Cell is assumed to be available for UEs:
  if Random Access Preambles group B exists:
    if the MAC Entity is configured with supplementaryUplink, and SUL carrier is selected for performing Random Access Procedure:
      $P_{CMAX,c\_SUL}$: the configured UE transmitted power of the SUL carrier;
    else:
      $P_{CMAX,c}$: the configured UE transmitted power of the Serving Cell performing the Random Access Procedure.

The following UE variables are used for the Random Access procedure:
  PREAMBLE_INDEX;
  PREAMBLE_TRANSMISSION_COUNTER;
  PREAMBLE_POWER_RAMPING_COUNTER;
  PREAMBLE_RECEIVED_TARGET_POWER;
  PREAMBLE_BACKOFF;
  PCMAX;
  TEMPORARY_C-RNTI.

When the Random Access procedure is initiated, the MAC entity shall:
  1> flush the Msg3 buffer;
  1> set the PREAMBLE_TRANSMISSION_COUNTER to 1;
  1> set the PREAMBLE_POWER_RAMPING_COUNTER to 1;
  1> set the PREAMBLE_BACKOFF to 0 ms;
  1> if the carrier to use for the Random Access procedure is explicitly signalled:
    2> select the signalled carrier for performing Random Access procedure;
  1> else if the carrier to use for the Random Access procedure is not explicitly signalled; and
  1> if the cell for the Random Access procedure is configured with supplementaryUplink; and
  1> if the RSRP of the downlink pathloss reference is less than sul-RSRP-Threshold:
    2> select the SUL carrier for performing Random Access procedure;
    2> set the PCMAX to $P_{CMAX,c\_SUL}$;
  1> else:
    2> select the normal carrier for performing Random Access procedure;
    2> set the PCMAX to $P_{CMAX,c}$;
  1> perform the Random Access Resource selection procedure (see subclause 5.1.2).

5.1.2 Random Access Resource Selection

The MAC entity shall:
  1> if the Random Access procedure was initiated by a beam failure indication from lower layer; and
  1> if the contention free PRACH resources for beam failure recovery request associated with any of the SS blocks and/or CSI-RSs have been explicitly provided by RRC; and 1> if at least one of the SS blocks with SS-RSRP above rsrp-ThresholdSSB amongst the associated SS blocks or the CSI-RSs with CSI-RSRP above csirs-dedicatedRACH-Threshold amongst the associated CSI-RSs is available:
   2> select an SS block with SS-RSRP above rsrp-ThresholdSSB amongst the associated SS blocks or a CSI-RS with CSI-RSRP above csirs-dedicatedRACH-Threshold amongst the associated CSI-RSs;
   2> set the PREAMBLE_INDEX to a ra-PreambleIndex corresponding to the selected SS block or CSI-RS from the set of Random Access Preambles for beam failure recovery request;
1> else if the ra-PreambleIndex has been explicitly provided by either PDCCH or RRC; and
1> if the ra-PreambleIndex is not 0b000000; and
1> if contention free PRACH resource associated with SS blocks or CSI-RS have not been explicitly provided by RRC:
   2> set the PREAMBLE_INDEX to the signalled ra-PreambleIndex;
1> else if the contention free PRACH resources associated with SS blocks have been explicitly provided by RRC and at least one SS block with SS-RSRP above rsrp-ThresholdSSB amongst the associated SS blocks is available:
   2> select an SS block with SS-RSRP above rsrp-ThresholdSSB amongst the associated SS blocks;
   2> set the PREAMBLE_INDEX to a ra-PreambleIndex corresponding to the selected SS block;
1> else if the contention free PRACH resources associated with CSI-RSs have been explicitly provided by RRC and at least one CSI-RS with CSI-RSRP above csirs-dedicatedRACH-Threshold amongst the associated CSI-RSs is available:
   2> select a CSI-RS with CSI-RSRP above csirs-dedicatedRACH-Threshold amongst the associated CSI-RSs;
   2> set the PREAMBLE_INDEX to a ra-PreambleIndex corresponding to the selected CSI-RS;
1> else:
   2> select a SS block with SS-RSRP above rsrp-ThresholdSSB;
   2> if Msg3 has not yet been transmitted:
     3> if Random Access Preambles group B exists; and
     3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)–ra-PreambleInitialReceivedTargetPower:
       4> select the Random Access Preambles group B;
     3> else:
       4> select the Random Access Preambles group A.
   2> else (i.e. Msg3 is being retransmitted):
     3> select the same group of Random Access Preambles as was used for the preamble transmission attempt corresponding to the first transmission of Msg3.
   2> if the association between Random Access Preambles and SS blocks is configured:
     3> select a ra-PreambleIndex randomly with equal probability from the random access preambles associated with the selected SS block and the selected group;
   2> else:
     3> select a ra-PreambleIndex randomly with equal probability from the random access preambles within the selected group;
   2> set the PREAMBLE_INDEX to the selected ra-PreambleIndex;
1> if an SS block is selected above and an association between PRACH occasions and SS blocks is configured:
   2> determine the next available PRACH occasion from the PRACH occasions corresponding to the selected SS block;
1> else if a CSI-RS is selected above and an association between PRACH occasions and CSI-RSs is configured:
   2> determine the next available PRACH occasion from the PRACH occasions corresponding to the selected CSI-RS;
1> else:
   2> determine the next available PRACH occasion;
1> perform the Random Access Preamble transmission procedure (see subclause 5.1.3).

5.1.3 Random Access Preamble Transmission

The MAC entity shall, for each preamble:
1> if PREAMBLE_TRANSMISSION_COUNTER is greater than one; and
1> if the notification of suspending power ramping counter has not been received from lower layers; and
1> if SS block selected is not changed (i.e. same as the previous random access preamble transmission):
   2> increment PREAMBLE_POWER_RAMPING_COUNTER by 1;
1> set PREAMBLE_RECEIVED_TARGET_POWER to ra-PreambleInitialReceivedTargetPower+DELTA_PREAMBLE+(PREAMBLE_POWER_RAMPING_COUNTER−1)*powerRampingStep;
1> except for contention free preamble for beam failure recovery request, compute the RA-RNTI associated with the PRACH in which the Random Access Preamble is transmitted;
1> instruct the physical layer to transmit the preamble using the selected PRACH, corresponding RA-RNTI (if available), PREAMBLE_INDEX and PREAMBLE_RECEIVED_TARGET_POWER.

The RA-RNTI associated with the PRACH in which the Random Access Preamble is transmitted, is computed as:

$$\text{RA-RNTI}=1+s\_id+14*t\_id+14*X*f\_id+14*X*Y*ul\_carrier\_id$$

where s_id is the index of the first OFDM symbol of the specified PRACH ($0 \le s\_id < 14$), t_id is the index of the first slot of the specified PRACH in a system frame ($0 \le t\_id < X$), f_id is the index of the specified PRACH in the frequency domain ($0 \le f\_id < Y$), and ul_carrier_id is the UL carrier used for Msg1 transmission (0 for normal carrier, and 1 for SUL carrier). The values X and Y are specified in TS 38.213 [6].

5.1.4 Random Access Response Reception

Once the Random Access Preamble is transmitted and regardless of the possible occurrence of a measurement gap, the MAC entity shall:
1> if 'multiple preamble transmission' has been signalled:
   2> start the ra-ResponseWindow at the start of the first PDCCH occasion after a fixed duration of X symbols (specified in TS 38.213 [6]) from the end of the first preamble transmission;
   2> monitor the PDCCH of the SpCell for Random Access Response(s) identified by the RA-RNTI(s) while ra-ResponseWindow is running;

1> else if the contention free Random Access Preamble for beam failure recovery request was transmitted by the MAC entity:
   2> start the bfr-ResponseWindow at the start of the first PDCCH occasion after a fixed duration of X symbols (specified in TS 38.213 [6]) from the end of the preamble transmission;
   2> monitor the PDCCH of the SpCell for response to beam failure recovery request identified by the C-RNTI while bfr-ResponseWindow is running;
1> else:
   2> start the ra-ResponseWindow at the start of the first PDCCH occasion after a fixed duration of X symbols (specified in TS 38.213 [6]) from the end of the preamble transmission;
   2> monitor the PDCCH of the SpCell for Random Access Response(s) identified by the RA-RNTI while the ra-ResponseWindow is running;
1> if PDCCH transmission is addressed to the C-RNTI; and
1> if the contention free Random Access Preamble for beam failure recovery request was transmitted by the MAC entity:
   2> consider the Random Access procedure successfully completed.
1> else if a downlink assignment has been received on the PDCCH for the RA-RNTI and the received TB is successfully decoded:
   2> if the Random Access Response contains a Backoff Indicator subheader:
     3> set the PREAMBLE_BACKOFF to value of the BI field of the Backoff Indicator subheader using Table 7.2-1.
   2> else:
     3> set the PREAMBLE_BACKOFF to 0 ms.
   2> if the Random Access Response contains a Random Access Preamble identifier corresponding to the transmitted PREAMBLE_INDEX (see subclause 5.1.3):
     3> consider this Random Access Response reception successful;
   2> if the Random Access Response reception is considered successful:
     3> if the Random Access Response includes RAPID only:
       4> consider this Random Access procedure successfully completed;
       4> indicate the reception of an acknowledgement for the SI request to upper layers;
     3> else:
       4> if 'multiple preamble transmission' has been signalled:
         5> stop transmitting remaining preambles, if any;
       4> apply the following actions for the Serving Cell where the Random Access Preamble was transmitted:
         5> process the received Timing Advance Command (see subclause 5.2);
         5> indicate the ra-PreambleInitialReceivedTargetPower and the amount of power ramping applied to the latest preamble transmission to lower layers (i.e. (PREAMBLE_POWER_RAMPING_COUNTER−1)*powerRampingStep);
         5> process the received UL grant value and indicate it to the lower layers;
       4> if the Random Access Preamble was not selected by the MAC entity among the common PRACH preambles:
         5> consider the Random Access procedure successfully completed.
       4> else:
         5> set the TEMPORARY_C-RNTI to the value received in the Random Access Response;
         5> if this is the first successfully received Random Access Response within this Random Access procedure:
           6> if the transmission is not being made for the CCCH logical channel:
             7> indicate to the Multiplexing and assembly entity to include a C-RNTI MAC CE in the subsequent uplink transmission;
           6> obtain the MAC PDU to transmit from the Multiplexing and assembly entity and store it in the Msg3 buffer.
1> if ra-ResponseWindow expires, and if the Random Access Response containing Random Access Preamble identifiers that matches the transmitted PREAMBLE_INDEX has not been received; or
1> if bfr-ResponseWindow expires and if the PDCCH addressed to the C-RNTI has not been received:
   2> consider the Random Access Response reception not successful;
   2> increment PREAMBLE_TRANSMISSION_COUNTER by 1;
   2> if PREAMBLE_TRANSMISSION_COUNTER=ra-PreambleTx-Max+1:
     3> if the Random Access Preamble is transmitted on the SpCell:
       4> indicate a Random Access problem to upper layers;
     3> else if the Random Access Preamble is transmitted on a SCell:
       4> consider the Random Access procedure unsuccessfully completed;
   2> if in this Random Access procedure, the Random Access Preamble was selected by MAC among the common PRACH preambles:
     3> select a random backoff time according to a uniform distribution between 0 and the PREAMBLE_BACKOFF;
     3> delay the subsequent Random Access Preamble transmission by the backoff time;
   2> perform the Random Access Resource selection procedure (see subclause 5.1.2).

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response transmission.

5.1.5 Contention Resolution

Contention Resolution is based on either C-RNTI on PDCCH of the SpCell or UE Contention Resolution Identity on DL-SCH.

Once Msg3 is transmitted, the MAC entity shall:
   1> start the ra-ContentionResolutionTimer and restart the ra-ContentionResolution Timer at each HARQ retransmission;

1> monitor the PDCCH while the ra-ContentionResolutionTimer is running regardless of the possible occurrence of a measurement gap;
1> if notification of a reception of a PDCCH transmission is received from lower layers:
  2> if the C-RNTI MAC CE was included in Msg3:
    3> if the Random Access procedure was initiated by the MAC sublayer itself or by the RRC sublayer and the PDCCH transmission is addressed to the C-RNTI and contains an UL grant for a new transmission; or
    3> if the Random Access procedure was initiated by a PDCCH order and the PDCCH transmission is addressed to the C-RNTI:
      4> consider this Contention Resolution successful;
      4> stop ra-ContentionResolution Timer;
      4> discard the TEMPORARY_C-RNTI;
      4> consider this Random Access procedure successfully completed.
  2> else if the CCCH SDU was included in Msg3 and the PDCCH transmission is addressed to its TEMPORARY_C-RNTI:
    3> if the MAC PDU is successfully decoded:
      4> stop ra-ContentionResolution Timer;
      4> if the MAC PDU contains a UE Contention Resolution Identity MAC CE; and
      4> if the UE Contention Resolution Identity in the MAC CE matches the CCCH SDU transmitted in Msg3:
        5> consider this Contention Resolution successful and finish the disassembly and demultiplexing of the MAC PDU;
        5> set the C-RNTI to the value of the TEMPORARY_C-RNTI;
        5> discard the TEMPORARY_C-RNTI;
        5> consider this Random Access procedure successfully completed.
      4> else
        5> discard the TEMPORARY_C-RNTI;
        5> consider this Contention Resolution not successful and discard the successfully decoded MAC PDU.
1> if ra-ContentionResolutionTimer expires:
  2> discard the TEMPORARY_C-RNTI;
  2> consider the Contention Resolution not successful.
1> if the Contention Resolution is considered not successful:
  2> flush the HARQ buffer used for transmission of the MAC PDU in the Msg3 buffer;
  2> increment PREAMBLE_TRANSMISSION_COUNTER by 1;
  2> if PREAMBLE_TRANSMISSION_COUNTER= preambleTransMax+1:
    3> indicate a Random Access problem to upper layers.
  2> select a random backoff time according to a uniform distribution between 0 and the PREAMBLE_BACKOFF;
  2> delay the subsequent Random Access Preamble transmission by the backoff time;
  2> perform the Random Access Resource selection procedure (see subclause 5.1.2).

5.1.6 Completion of the Random Access Procedure

Upon completion of the Random Access procedure, the MAC entity shall:
  1> discard explicitly signalled ra-PreambleIndex, if any;
  1> flush the HARQ buffer used for transmission of the MAC PDU in the Msg3 buffer.

In NR, the carrier bandwidth could be much larger (e.g. up to 400 MHz) as compared to LTE (e.g. up to 20 MHz). As a UE may not be capable to support the full bandwidth of a carrier, the concept of bandwidth part (BWP) is introduced. A UE is not required to receive any DL signals outside a frequency range which is configured to the UE. One or multiple BWP configurations for each component carrier can be semi-statically signalled to a UE. Configuration of a BWP may include information to indicate numerology (sub-carrier spacing), frequency location (e.g. center frequency), and bandwidth (e.g. number of PRBs). Each BWP is associated with a specific numerology (sub-carrier spacing or CP type). A UE expects at least one DL (Downlink) BWP and one UL (Uplink) BWP being active among the set of configured BWPs for a given time instant. A UE is only assumed to receive or transmit within active DL/UL BWP(s) using the associated numerology. There is an initial active DL or UL BWP pair to be valid for a UE until the UE is explicitly (re)configured with BWP(s) during or after RRC connection is established.

In Rel-15, for a UE, there is at most one active DL BWP and at most one active UL BWP at a given time for a serving cell. For each serving cell of the UE, one or more DL BWPs and one or more UL BWPs can be configured by dedicated RRC for a UE. NR supports the case that a single scheduling downlink control information (DCI) can switch the UE's active BWP from one to another (of the same link direction) within a given serving cell.

RAN1 has further agreed that a dedicated timer is supported for timer-based active DL BWP (or DL/UL BWP pair) switching to the default DL BWP (or default DL/UL BWP pair). According to RAN1 agreements, for paired spectrum (e.g. Frequency-division duplex, FDD), the UE starts the dedicated timer when it switches its active DL BWP to a DL BWP other than the default DL BWP, and the UE restarts the dedicated timer to the initial value when it successfully decodes a DCI to schedule PDSCH(s) in its active DL BWP. When the dedicated timer expires, the UE switches its active DL BWP to the default DL BWP regardless what BWP is using as active BWP before. For unpaired spectrum (e.g. Time-division duplex, TDD), one DL BWP and one UL BWP form a pair, and are switched jointly. For unpaired spectrum, the UE restarts the dedicated timer to the initial value when it successfully decodes a DCI to schedule PUSCH(s) in its active DL or UL BWP pair. The default DL BWP could be optionally configured to the UE for a serving cell (e.g. PCell (Primary Cell) and/or SCell (Secondary Cell)).

For PCell, if no default DL BWP is configured, the default DL BWP is the initial active DL BWP (i.e. the BWP used to perform initial access); if a default DL BWP is configured, the default DL BWP could be the same or different from the initial active DL BWP. For SCell, RRC (Radio Resource Control) signaling for SCell configuration or reconfiguration indicates the first active DL BWP and/or the first active UL BWP, which will be considered as active when the SCell is activated. The default DL BWP (if configured) could be the same or different from the first active DL BWP. The first active BWP of SCell could also be regarded as the initial active BWP of SCell.

One purpose of introducing the dedicated timer (referred to as "BWP inactivity timer" or "BWP timer" in below) is for reducing UE power-consumption. When there is traffic on a serving cell, network (NW) may schedule the UE and switch the UE's active BWP from default BWP to a wide-bandwidth BWP for increasing data throughput. The BWP inactivity timer will thus be started and restarted accordingly. When there is no traffic for a while, the timer expires and UE switches active BWP back to the default one without NW signaling. The default BWP could be a narrow-bandwidth BWP, and the UE only needs to monitor PDCCH occasions on the default BWP with reduced power-consumption. NW can even configure the default BWP with less frequent PDCCH (Physical Downlink Control Channel) occasions for further reducing UE's power-consumption. Another purpose of the BWP inactivity timer is to design a fallback mechanism for error handling (e.g. if UE could not be able to receive NW signaling for a long time).

In Rel-15, for a UE, there is at most one active DL BWP and at most one active UL BWP at a given time for a Serving Cell. When UE is performing a contention-based RA procedure, if there is PRACH resource on the current active UL BWP, the UE transmits a RA preamble (Msg1) on the current active UL BWP and tries to receive a RA Response (RAR/Msg2) on the current active DL BWP. Otherwise the UE switches to the initial active UL BWP and the initial active DL BWP, and then performs Msg1 transmission and Msg2 reception. When UE is performing a contention-free RA procedure, the UL BWP for Msg1 transmission and DL BWP for Msg2 reception may be indicated in NW signaling (e.g. PDCCH order, handover command), in system information (SI), or in RRC configuration.

It is possible that in a future release of NR, there could be more than one active DL BWP and/or more than one active UL BWP at a given time for a Serving Cell. If more than one active UL BWP is configured with PRACH resources, there is a need for the UE to determine which active UL BWP is selected for Msg1 transmission. The UE may also need to select one of the active BWPs for Msg2 reception, Msg3 transmission, and Msg4 reception. Each candidate UL BWP is configured with RACH resource for Msg1 transmission.

For Msg1 transmission, some alternatives for selecting the UL BWP could be as follows:
1. The one with the earliest PRACH occasion or the shortest slot length
   In order to transmit the first Msg1 as soon as possible, the UE could select the active UL BWP with the earliest PRACH occasion. A BWP with the shortest slot length (determined by numerology of this BWP) may have more frequent PRACH occasions as compared to BWPs with longer slot length, so it could also be a good choice for the UE to (re-)transmit the Msg1.
2. Based on channel quality of DL or UL BWP
   To increase the probability that NW successfully receives the Msg1 transmitted by the UE, another alternative is to select the active UL BWP with the best channel quality. The UL channel quality of the UE is measured by the NW through Sounding Reference Signal (SRS), and NW could report UL-quality-related information to the UE (e.g. through a MAC Control Element). Another way is to infer the UL channel quality through the corresponding DL channel quality. The UE could select the active UL BWP corresponding to the active DL BWP with the best channel quality. The UE could measure the DL channel quality through the DL reference signal (DL-RS). The DL-RS could be SSB and/or CSI-RS.
3. Based on logical channel (LCH) which triggers the RA
   In Scheduling Request (SR) procedure, there is an explicit mapping between LCH and SR configuration. When a LCH triggers SR, the UE selects the SR configuration associated with this LCH to transmit SR. There could also be an explicit mapping between LCH and PRACH resources under different UL BWPs. The UE could select the associated UL BWP to transmit the Msg1 if the associated UL BWP is active. If the associated UL BWP is not active, the UE could switch to initial active UL BWP to transmit the Msg1. If more than one active UL BWP is associated with the LCH, the UE could apply other alternatives specified above or in below.
   In Logical Channel Prioritization (LCP) procedure, there could be a restriction for a LCH to use the UL grant. For example, a LCH can use a UL grant if the transmission duration of PUSCH scheduled by the grant is shorter than a value configured to this LCH. For example, a LCH can use a UL grant if the numerology of PUSCH scheduled by the grant is one of the allowed numerologies configured to this LCH. For RA procedure, it is also feasible to configure such restrictions to each LCH. When a LCH triggers an RA procedure (e.g. due to UL data arrival in this LCH), UE selects one UL BWP from those which satisfies the restriction configured to this LCH. If no active UL BWP satisfies the restriction, the UE could switch to initial active UL BWP to transmit the Msg1. If more than one active UL BWP satisfies the restriction, the UE could apply other alternatives specified above or in below.
4. Based on priority of BWP
   NW may explicitly configure a priority to those UL BWPs having PRACH resources, or may implicitly configure the priority of each UL BWP through BWP configuration index. For example, the first BWP configuration has the highest priority, and the last BWP configuration has the lowest priority. As another example, the first BWP configuration has the lowest priority, and the last BWP configuration has the highest priority. The UE could select the active UL BWP with higher priority when an RA procedure is triggered. If more than one active UL BWP has the same priority, the UE could apply other alternatives specified above or in below.
5. The one paired with the DL BWP receiving the PDCCH order
   For RA procedure triggered by a PDCCH order (e.g. DL data arrival), and in case there is a pairing/mapping between active DL BWP and active UL BWP, the UE could select the UL BWP paired or mapped to the DL BWP receiving PDCCH order. If more than one UL BWP maps to the DL BWP receiving PDCCH order, the UE could apply other alternatives specified above or in below.
6. The one indicated in the PDCCH order (e.g. through a first BWP index field)
   For RA procedure triggered by PDCCH order (e.g. DL data arrival), the UE may be indicated by the PDCCH order to use certain UL BWP to transmit the Msg1. The indication could be a BWP index field in the PDCCH order. The indication could be (implicitly) based on other field(s) in the PDCCH order.

For Msg2 reception during the ra-ResponseWindow, some alternatives for selecting the DL BWP could be as follows:
1. UE monitors all active DL BWPs (no selection)
   This alternative does not require a pairing/mapping between DL BWP and UL BWP. In addition, NW does not need to know which UE transmits the Msg1 (i.e. could be applied for both contention-based and contention-free RA procedure). UE just monitors the current active DL BWP(s) and tries to decode PDCCH for Msg2 reception. NW may send Msg2 on all possible active DL BWPs to prevent the UE from not receiving the Msg2. One drawback of this alternative could be power consumption.

2. The one paired with the active UL BWP for Msg1 transmission

In case there is a pairing/mapping between an active DL BWP and an active UL BWP, NW may send the Msg2 on the DL BWP paired with the UL BWP receiving Msg1. UE could monitor the active DL BWP paired with the UL BWP transmitting Msg1, and may not need to monitor other active DL BWP(s). One drawback of not monitoring other active DL BWP(s) could be missing PDCCH on other active DL BWP(s) if NW is unaware of the UE performing the RA procedure. If more than one DL BWP maps to the UL BWP transmitting Msg1, the UE could apply other alternatives specified above or in below.

3. The one receiving the PDCCH order

For contention-free RA procedure triggered by PDCCH order (e.g. DL data arrival), NW can identify which UE transmits the Msg1, and it does not need to send Msg2 on all possible active DL BWPs. The UE could monitor the DL BWP receiving PDCCH order and try to decode PDCCH for Msg2 reception, and may not need to monitor other active DL BWP(s). In case the UE does not monitor other active DL BWP(s), NW can by itself avoid sending PDCCH on other active DL BWP(s), and thus UE will not miss any PDCCH.

4. The one indicated in PDCCH order (e.g. through a second BWP index field)

For RA procedure triggered by PDCCH order (e.g. DL data arrival), the UE may be indicated by the PDCCH order to use certain DL BWP to receive the Msg2. The indication could be a BWP index field in the PDCCH order. The indication could be (implicitly) based on other field(s) in the PDCCH order. The UE may not need to monitor other active DL BWP(s). In case the UE does not monitor other active DL BWP(s), NW can by itself avoid sending PDCCH on other active DL BWP(s), and thus UE will not miss any PDCCH.

For Msg3 transmission, some alternatives for selecting UL BWP could be as follows:

1. The same one as for Msg1 transmission

For simplicity, UE could use the UL BWP for Msg1 transmission as the UL BWP for Msg3 transmission.

2. According to UL grant in Msg2 (RAR)

For contention-based RA, although NW cannot identify which UE transmits the Msg1, it is still possible for the NW to indicate the UE receiving Msg2 to transmit Msg3 on certain UL BWP. The indication could be a BWP index field in the RAR payload. The indication could be (implicitly) based on resource allocation related information in the RAR payload.

3. The one indicated in PDCCH order (e.g. through a third BWP index field)

For contention-based RA procedure triggered by PDCCH order (e.g. DL data arrival), the UE may be indicated by the PDCCH order to use certain UL BWP to transmit the Msg3. The indication could be a BWP index field in the PDCCH order. The indication could be (implicitly) based on other field(s) in the PDCCH order.

For Msg4 PDCCH reception during ra-ContentionResolutionTimer, some alternatives for selecting DL BWP could be as follows:

1. UE monitors all active DL BWPs (no selection)

This alternative does not require a pairing/mapping between DL BWP and UL BWP. UE just monitors current active DL BWP(s) and tries to decode PDCCH for Msg4. Because now NW can identify which UE transmits the Msg3, it could select one of the UE active DL BWP(s) to send the Msg4 PDCCH without any restriction. One drawback of this alternative could be power consumption.

2. The same one as for Msg2 reception

For simplicity, UE could use the DL BWP for Msg2 reception as the DL BWP for Msg4 PDCCH reception. If NW does not know which DL BWP the UE receives Msg2, the NW needs to send Msg4 PDCCH on all possible active DL BWPs, resulting in signaling overhead.

3. The one paired with UL BWP for Msg3

In case there is a pairing/mapping between active DL BWP and active UL BWP, NW may send the Msg4 PDCCH on the DL BWP paired with the UL BWP receiving Msg3. UE could monitor the active DL BWP paired with the UL BWP transmitting Msg3, and may not need to monitor other active DL BWP(s). One drawback of not monitoring other active DL BWP(s) could be missing PDCCH on other active DL BWP(s) if NW is unaware of the UE RA procedure. If more than one DL BWP maps to the UL BWP transmitting Msg3, the UE could apply other alternatives specified above or in below.

4. The one indicated in PDCCH order (e.g. through a forth BWP index field)

For contention-based RA procedure triggered by PDCCH order (e.g. DL data arrival), the UE may be indicated by the PDCCH order to use certain DL BWP to receive the Msg4 PDCCH. The indication could be a BWP index field in the PDCCH order. The indication could be (implicitly) based on other field(s) in the PDCCH order.

The pairing or mapping between DL BWP and UL BWP could be configured explicitly e.g. through a mapping table. Alternatively, the pairing or mapping between DL BWP and UL BWP could be configured implicitly e.g. through BWP index. For example, the N-th DL BWP configuration is paired with the N-th UL BWP configuration.

The pairing or mapping could be one-to-one mapping or one-to-many mapping. The pairing or mapping could be common for all UEs under a Serving Cell or specific for a UE. The pairing or mapping could be applicable to a Serving Cell operated in paired spectrum (e.g. FDD mode) or a Serving Cell operated in unpaired spectrum (e.g. TDD mode). In case the pairing or mapping is common for all UEs under a Serving Cell, the NW can exploit the mapping without identifying which UE transmits the Msg1 or Msg3. In case the pairing/mapping is specific for a UE, the NW can exploit the mapping when it identifies which UE transmits the Msg1 or Msg3.

For supporting single active BWP at a time, BWP switching (i.e. deactivating one BWP and activating another BWP) is enough. A scheduling DCI (i.e. PDCCH indicating uplink grant or downlink assignment) could trigger BWP switching in case the BWP been scheduled is not currently active. But BWP switching cannot result in more than one active BWP at a time.

To achieve multiple active BWPs at a time, the scheduling DCI could always activate the BWP been scheduled, rather than switching the active BWP. For example, a UE receives a scheduling DCI on a first BWP scheduling a second BWP. If the second BWP is not active, the UE will activate the second BWP, but will not deactivate the first BWP. The scheduling DCI may activate the BWP rather than switching in case this scheduling DCI indicates an UL grant rather than a DL assignment. The scheduling DCI may activate the BWP rather than switching in case this scheduling DCI indicates a DL assignment rather than an UL grant.

Another alternative is the scheduling DCI could activate, deactivate, or switch the BWP based on indication in the scheduling DCI. For example, the indication could be a new field introduced in the scheduling DCI. The indication could also be setting existing field(s) in the scheduling DCI to certain value(s).

A third alternative is the scheduling DCI could activate or switch the BWP depending on the state of the BWP been scheduled. For example, the scheduling DCI could activate the BWP been scheduled in case the BWP been scheduled is not currently active. The scheduling DCI could also switch the active BWP in case the scheduling DCI is received on a first BWP scheduling a second BWP but the second BWP is already active.

The above solutions may apply to DL BWP, UL BWP, or both DL BWP and UL BWP.

In addition, to deactivate one of the multiple active BWPs, the BWP inactivity timer could be applied per-BWP (except for the default BWP). For example, when there are two active DL BWPs on a Serving Cell, the UE maintains two BWP inactivity timers. If one timer expires, the UE should deactivate the corresponding DL BWP while the other DL BWP remains active. In FDD mode, as there is no timer to deactivate the active UL BWP, a new NW signaling (e.g. a DCI) and/or a new timer similar to the BWP inactivity timer could be introduced. Another way is to pair each active UL BWP with an active DL BWP also in FDD mode. The UE could deactivate the UL BWP when the corresponding DL BWP is deactivated. The UE may need to activate the UL BWP when the corresponding DL BWP is activated. The UE may not need to activate the UL BWP when the corresponding DL BWP is activated.

The relation between active BWP (not including default BWP), BWP inactivity timer, and default BWP could be:
1. All active BWPs share the same BWP inactivity timer and share the same default BWP. For example, the BWP inactivity timer could be (re-)started when receiving scheduling DCI on any active BWP. When the BWP inactivity timer expires, all active BWPs could be deactivated, and the default BWP could be activated accordingly.
2. All active BWPs share the same default BWP. But the BWP inactivity timer is dedicated to each active BWP (i.e. per-BWP). For example, the BWP inactivity timer could be (re-)started when receiving scheduling DCI on its associated active BWP. When one BWP inactivity timer expires, the associated active BWP could be deactivated. When the last active BWP is deactivated, the default BWP could be activated accordingly.
3. Each active BWP has its own BWP inactivity timer and has its own default BWP. Some active BWP(s) may not have its BWP inactivity timer or own default BWP. For example, the BWP inactivity timer could be (re-)started when receiving scheduling DCI on its associated active BWP. When one BWP inactivity timer expires, the associated active BWP could be deactivated and the associated default BWP is activated accordingly.

Figure 5:
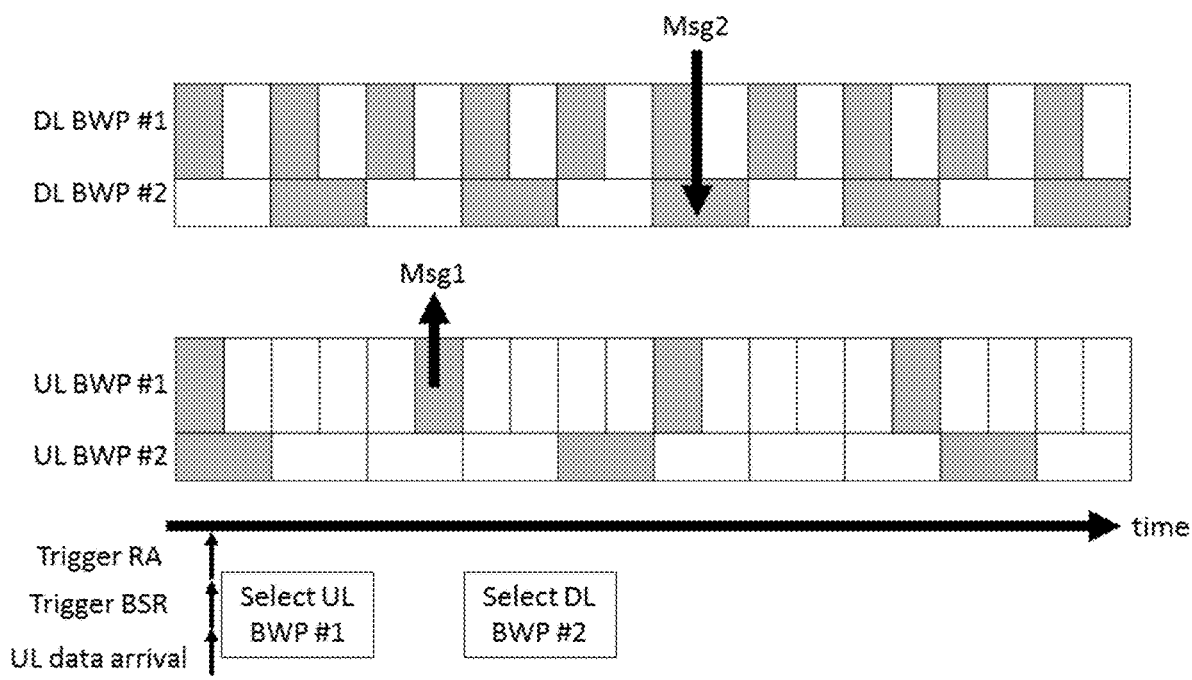
FIG. 5 illustrates an example of selecting BWP for Random Access procedure triggered due to uplink data arrival according to one exemplary embodiment.

FIG. 5 illustrates an example of selecting BWP for Random Access procedure triggered due to uplink data arrival. In FIG. 5, dark color in UL BWP indicates that there is PRACH occasion for Msg1 transmission, and dark color in DL BWP indicates that there is PDCCH occasion for Msg2 PDCCH reception.

Figure 6:
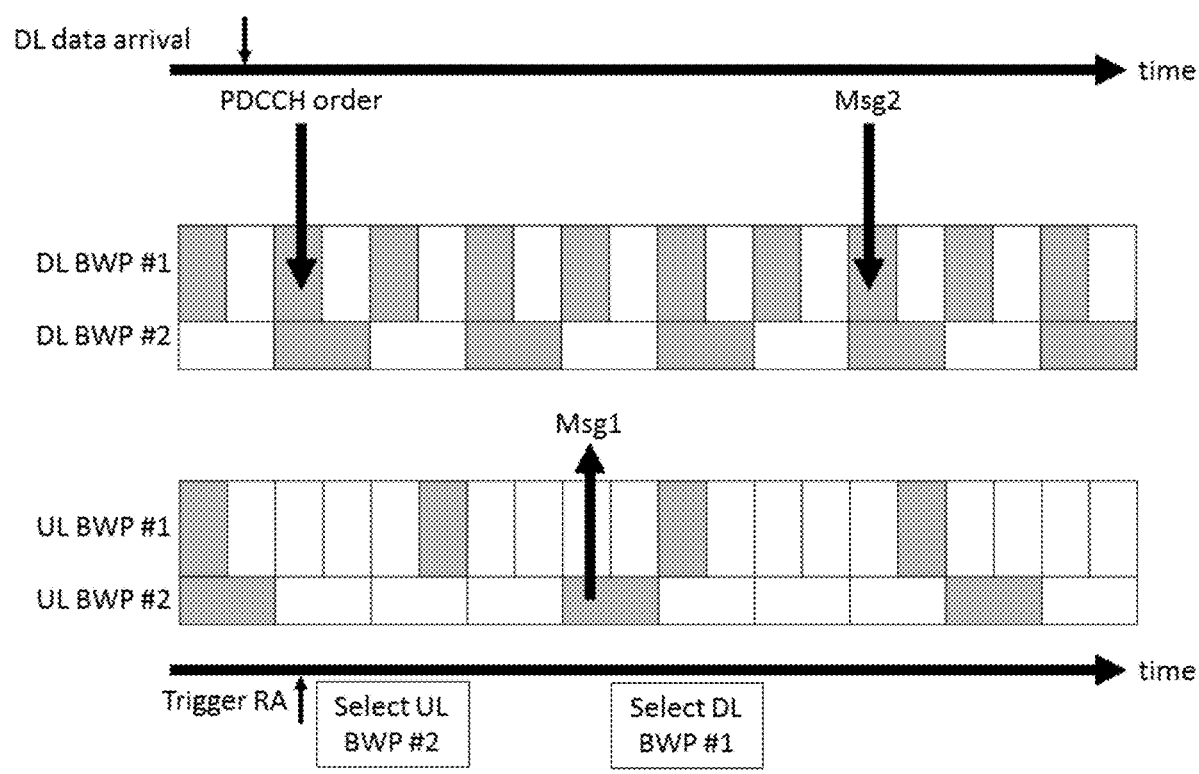
FIG. 6 is an example of selecting BWP for Random Access procedure triggered by PDCCH (Physical Downlink Control Channel) order according to one embodiment.

FIG. 6 illustrates an example of selecting BWP for Random Access procedure triggered by PDCCH order (e.g. due to downlink data arrival). In FIG. 6, dark color in UL BWP indicates that there is PRACH occasion for Msg1 transmission, and dark color in DL BWP indicates that there is PDCCH occasion for Msg2 PDCCH reception.

Figure 7:
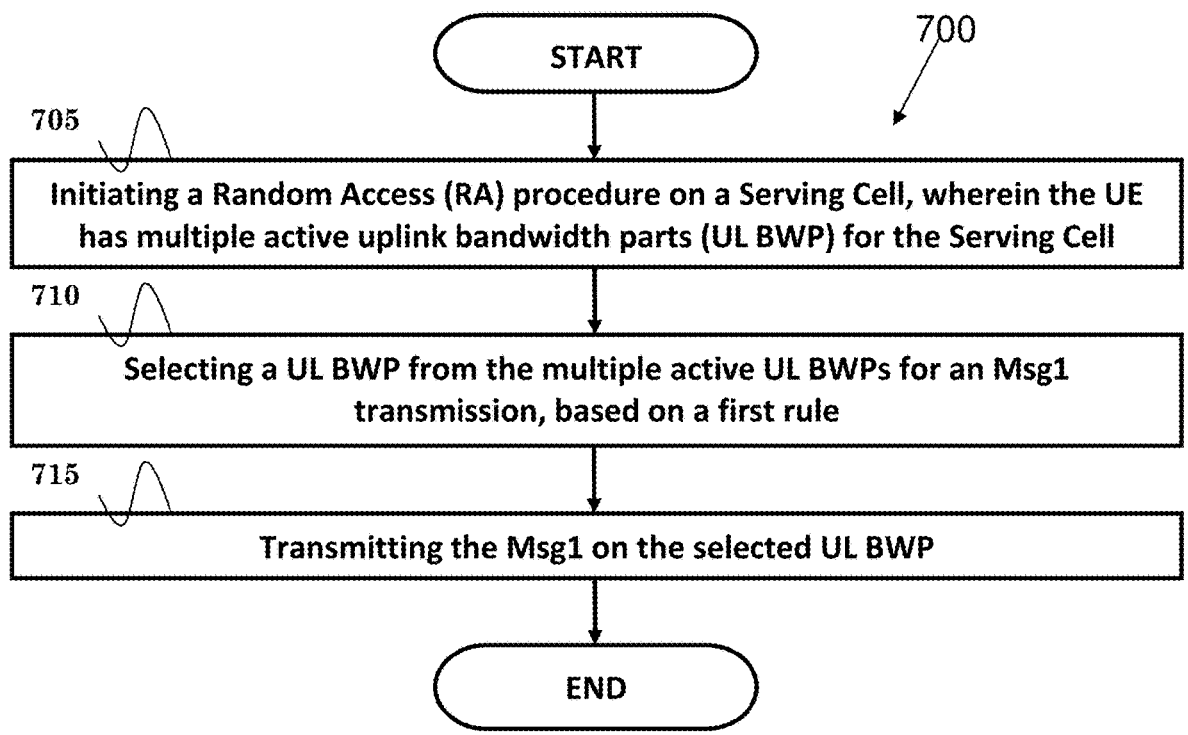
FIG. 7 is a flow chart according to one exemplary embodiment.

FIG. 7 is a flow chart 700 according to one exemplary embodiment from the perspective of a UE. In step 705, the UE initiates a Random Access (RA) procedure on a Serving Cell, wherein the UE has multiple active uplink bandwidth parts (UL BWP) for the Serving Cell.

In step 710, the UE selects a UL BWP from the multiple active UL BWPs for an Msg1 transmission, based on a first rule. In one embodiment, the first rule could be selecting the active UL BWP corresponding to an active DL BWP with the best DL channel quality. The UE could determine a DL channel quality by performing measurement on downlink reference signal (DL-RS) of the DL BWP.

In one embodiment, the first rule could be selecting the active UL BWP corresponding to (or mapped to) an (active) DL BWP on which a PDCCH (Physical Downlink Control Channel) order is received, wherein the UE initiates the RA procedure in response to reception of the PDCCH order. Alternatively, the first rule could be selecting the active UL BWP based on a logical channel (LCH) which triggers the RA procedure due to UL data arrival on the LCH.

In step 715, the UE transmits the Msg1 on the selected UL BWP. In one embodiment, the UE could select a downlink (DL) BWP from multiple active DL BWPs for an Msg2 reception, based on a second rule, and monitors PDCCH (Physical Downlink Control Channel) for the Msg2 on the selected DL BWP after transmitting the Msg1, wherein the UE has multiple active DL BWPs for the Serving Cell. In one embodiment, the second rule could be selecting the DL BWP corresponding to the UL BWP transmitting the Msg1.

In one embodiment, each of the multiple active UL BWPs could be allocated with PRACH resources for Msg1 transmission before the RA procedure is initiated. The Msg1 could be a Random Access Preamble of the RA procedure. The Msg2 could be a Random Access Response of the RA procedure.

Referring back to FIGS. 3 and 4, in one exemplary embodiment of a UE, the device 300 includes a program code 312 stored in the memory 310. The CPU 308 could execute program code 312 to enable the UE (i) to initiate a RA procedure on a Serving Cell, wherein the UE has multiple active uplink bandwidth parts for the Serving Cell, (ii) to select a UL BWP from the multiple active UL BWPs for an Msg1 transmission, based on a first rule, and (iii) to transmit the Msg1 on the selected UL BWP. Furthermore, the CPU 308 can execute the program code 312 to perform all of the above-described actions and steps or others described herein.

Figure 8:
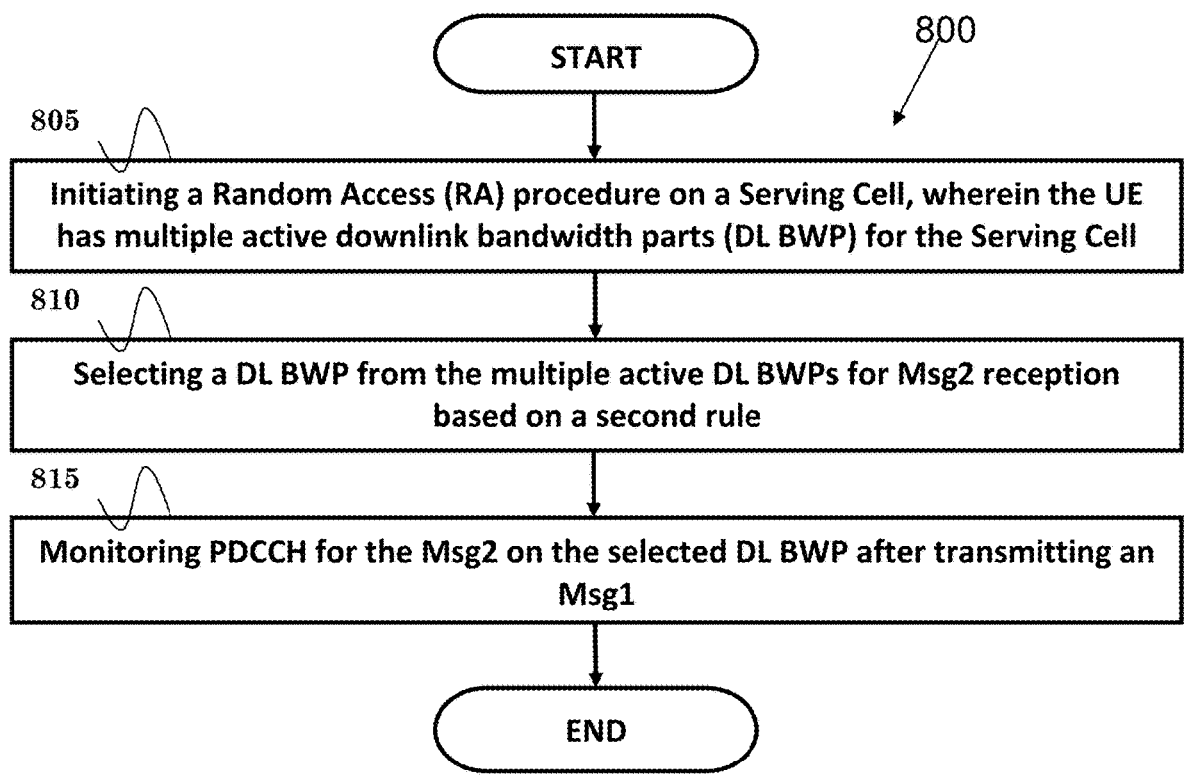
FIG. 8 is a flow chart according to one exemplary embodiment.

FIG. 8 is a flow chart 800 according to one exemplary embodiment from the perspective of a UE. In step 805, the UE initiates a Random Access (RA) procedure on a Serving Cell, wherein there are multiple active DL BWPs in the Serving Cell for the UE. In step 810, the UE selects a DL BWP from the multiple active DL BWPs for Msg2 reception based on a second rule. In step 815, the UE monitors PDCCH for the Msg2 on the selected DL BWP after transmitting an Msg1.

In one embodiment, after receiving a Msg2, the UE could select a UL BWP for Msg3 transmission based on a third rule, and then transmits a Msg3 on the selected UL BWP. Additionally, after transmitting the Msg3, the UE could select a DL BWP for Msg4 PDCCH reception based on a forth rule, and then monitors PDCCH for Msg4 on the selected DL BWP.

In one embodiment, the multiple active UL BWPs of the Serving Cell could be allocated with PRACH resources for Msg1 transmission when the RA procedure is initiated. Additionally or alternatively, the multiple active DL BWPs of the Serving Cell could be allocated with resources for PDCCH monitoring when the RA procedure is initiated.

In one embodiment, the Msg1 could be a Random Access Preamble of the RA procedure. The Msg2 could be a Random Access Response of the RA procedure. The Msg3 could be a UL data for Contention Resolution of the RA procedure.

In one embodiment, the PDCCH for Msg4 could be a UL grant or a DL assignment for Contention Resolution of the RA procedure. The UE could monitor PDCCH for Msg2 during ra-ResponseWindow or during ra-ContentionResolutionTimer.

In one embodiment, the first rule could be selecting the active UL BWP with the best UL channel quality. The UE could determine a UL channel quality by receiving UL channel quality related information from a network node.

In one embodiment, the first rule could be selecting the active UL BWP with PRACH resource mapped to the logical channel (LCH) triggering the RA procedure. The UE could receive a configuration for the mapping between each LCH and PRACH resource on a UL BWP. Alternatively, the first rule could be selecting the active UL BWP satisfying a restriction of the logical channel (LCH) triggering the RA procedure. The UE could receive a configuration for the restriction of each LCH. Alternatively, the first rule could be selecting the active UL BWP with the highest priority. The UE could receive a configuration for the priority of each UL BWP. The priority of each UL BWP could be in descent order of the UL BWP configuration index. Alternatively, the priority of each UL BWP could be in ascent order of the UL BWP configuration index.

In one embodiment, the second rule could be selecting the active DL BWP mapped to a UL BWP transmitting the Msg1. Alternatively, the second rule could be selecting the active DL BWP receiving a PDCCH order triggering the RA procedure.

In one embodiment, the third rule could be selecting the active UL BWP indicated by a UL grant in the Msg2. Alternatively, the third rule could be selecting the active UL BWP indicated in a PDCCH order triggering the RA procedure.

In one embodiment, the fourth rule could be selecting the active DL BWP mapped to a UL BWP transmitting the Msg3. Alternatively, the fourth rule could be selecting the active DL BWP indicated in a PDCCH order triggering the RA procedure.

In one embodiment, the UE may not monitor PDCCH on the active DL BWP(s) other than the one selected for monitoring PDCCH for Msg2. Furthermore, the UE may not monitor PDCCH on the active DL BWP(s) not selected for monitoring PDCCH for Msg4.

In one embodiment, there could be a mapping between active DL BWP and active UL BWP. The RA procedure could be a Contention-based RA procedure or a Contention-free RA procedure. The RA procedure could be triggered in response to receiving a network signalling. The RA procedure could also be triggered without receiving the network signalling.

In one embodiment, the network signalling could be a handover command, a PDCCH order, or an RRC message.

Referring back to FIGS. 3 and 4, in one exemplary embodiment of a UE, the device 300 includes a program code 312 stored in the memory 310. The CPU 308 could execute program code 312 to enable the UE (i) to initiate a RA procedure on a Serving Cell, wherein the UE has multiple active downlink bandwidth parts for the Serving Cell, (ii) to select a DL BWP from the multiple active DL BWPs for Msg2 reception based on a second rule, and (iii) to monitor PDCCH for the Msg2 on the selected DL BWP after transmitting an Msg1. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
initiating a Random Access (RA) procedure on a Serving Cell, wherein the UE has multiple active uplink bandwidth parts (UL BWP) for the Serving Cell;
selecting, from the multiple active UL BWPs, a UL BWP corresponding to an active downlink bandwidth part (DL BWP) with the best DL channel quality for an Msg1 transmission; and
transmitting the Msg1 on the selected UL BWP.

2. The method of claim 1, wherein the UE determines the best DL channel quality according to measurements on downlink reference signals (DL-RS) from active DL BWPs.

3. The method of claim 1, further comprising:
selecting a downlink (DL) BWP from multiple active DL BWPs for an Msg2 reception, based on a second rule, and monitoring PDCCH (Physical Downlink Control Channel) for the Msg2 on the selected DL BWP after transmitting the Msg1, wherein the UE has multiple active DL BWPs for the Serving Cell.

4. The method of claim 3, wherein the second rule is selecting the DL BWP corresponding to the UL BWP transmitting the Msg1.

5. The method of claim 1, wherein the first rule is selecting the active UL BWP corresponding to an active DL BWP on which a PDCCH (Physical Downlink Control Channel) order is received, wherein the UE initiates the RA procedure in response to reception of the PDCCH order.

6. The method of claim 1, wherein the first rule is selecting the active UL BWP based on a logical channel (LCH) which triggers the RA procedure due to UL data arrival on the LCH.

7. The method of claim 1, wherein each of the multiple active UL BWPs is allocated with PRACH resources for Msg1 transmission before the RA procedure is initiated.

8. The method of claim 1, wherein the Msg1 is a Random Access Preamble of the RA procedure.

9. The method of claim 1, wherein the Msg2 is a Random Access Response of the RA procedure.

10. A User Equipment (UE), comprising:
a control circuit;
a processor installed in the control circuit; and
a memory installed in the control circuit and operatively coupled to the processor;
wherein the processor is configured to execute a program code stored in the memory to:
initiate a Random Access (RA) procedure on a Serving Cell, wherein the UE has multiple active uplink bandwidth parts (UL BWP) for the Serving Cell;
select, from the multiple active UL BWPs, a UL BWP corresponding to an active downlink bandwidth part (DL BWP) with the best DL channel quality for an Msg1 transmission; and
transmit the Msg1 on the selected UL BWP.

11. The UE of claim 10, wherein the UE determines the best DL channel quality according to measurements on downlink reference signals (DL-RS) from active DL BWPs.

12. The UE of claim 10, wherein the processor is further configured to execute a program code stored in the memory to:
select a downlink (DL) BWP from multiple active DL BWPs for an Msg2 reception, based on a second rule, and monitors PDCCH (Physical Downlink Control Channel) for the Msg2 on the selected DL BWP after transmitting the Msg1, wherein the UE has multiple active DL BWPs for the Serving Cell.

13. The UE of claim 12, wherein the second rule is selecting the DL BWP corresponding to the UL BWP transmitting the Msg1.

14. The UE of claim 10, wherein the first rule is selecting the active UL BWP corresponding to an active DL BWP on which a PDCCH (Physical Downlink Control Channel) order is received, wherein the UE initiates the RA procedure in response to reception of the PDCCH order.

15. The UE of claim 10, wherein the first rule is selecting the active UL BWP based on a logical channel (LCH) which triggers the RA procedure due to UL data arrival on the LCH.

16. The UE of claim 10, wherein each of the multiple active UL BWPs is allocated with PRACH resources for Msg1 transmission before the RA procedure is initiated.

17. The UE of claim 10, wherein the Msg1 is a Random Access Preamble of the RA procedure.

18. The UE of claim 10, wherein the Msg2 is a Random Access Response of the RA procedure.

* * * * *